United States Patent
Choi et al.

(10) Patent No.: US 11,695,123 B2
(45) Date of Patent: Jul. 4, 2023

(54) CATHODE, LITHIUM-AIR BATTERY INCLUDING THE CATHODE, AND METHOD OF MANUFACTURING THE LITHIUM-AIR BATTERY

(71) Applicant: Samsung Electronics Co., Ltd., Suwon-si (KR)

(72) Inventors: Kyounghwan Choi, Suwon-si (KR); Hyunjin Kim, Seoul (KR); Wonsung Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/743,510

(22) Filed: Jan. 15, 2020

(65) Prior Publication Data
US 2020/0243871 A1    Jul. 30, 2020

(30) Foreign Application Priority Data
Jan. 24, 2019   (KR) .................. 10-2019-0009235

(51) Int. Cl.
*H01M 4/60*   (2006.01)
*H01M 4/86*   (2006.01)
*H01M 12/08*   (2006.01)
*H01M 12/02*   (2006.01)

(52) U.S. Cl.
CPC ......... *H01M 4/8673* (2013.01); *H01M 12/02* (2013.01); *H01M 12/08* (2013.01); *H01M 2004/8689* (2013.01); *H01M 2300/0082* (2013.01); *H01M 2300/0091* (2013.01)

(58) Field of Classification Search
CPC ............. H01M 4/8673; H01M 4/8652; H01M 4/8657; H01M 4/8663; H01M 12/02; H01M 12/08; H01M 2004/8689; H01M 2300/0082; H01M 2300/0091; H01M 2300/0094; H01M 2300/0065
See application file for complete search history.

(56) References Cited

U.S. PATENT DOCUMENTS

| | | | |
|---|---|---|---|
| 7,332,108 B2 | 2/2008 | Chartier et al. | |
| 7,824,795 B2 | 11/2010 | Yoshida et al. | |
| 8,293,143 B2 | 10/2012 | Chartier et al. | |
| 2014/0287305 A1 | 9/2014 | Wachsman et al. | |
| 2014/0363744 A1 | 12/2014 | Vereecken et al. | |
| 2016/0351973 A1* | 12/2016 | Albano | H01M 4/13 |
| 2018/0212237 A1* | 7/2018 | Lee | H01M 4/505 |
| 2020/0212451 A1 | 7/2020 | Kim et al. | |

FOREIGN PATENT DOCUMENTS

KR   1020170050561 A   5/2017

OTHER PUBLICATIONS

G. Girishkumar, et al., "Lithium-Air Battery: Promise and Challenges," The Journal of Physical Chemistry Letters, Jul. 2, 2010, vol. 1, pp. 2193-2203.

* cited by examiner

*Primary Examiner* — Raymond Alejandro
(74) *Attorney, Agent, or Firm* — Cantor Colburn LLP

(57) ABSTRACT

A cathode includes: a mixed conductive layer, wherein the mixed conductive layer includes a core-shell structured particle having a core portion including a solid electrolyte and a shell portion including an electronic conductor, wherein the cathode is configured to use oxygen as a cathode active material.

18 Claims, 4 Drawing Sheets

CATHODE, LITHIUM-AIR BATTERY INCLUDING THE CATHODE, AND METHOD OF MANUFACTURING THE LITHIUM-AIR BATTERY

CROSS-REFERENCE TO RELATED APPLICATION

This application claims priority to and the benefit of Korean Patent Application No. 10-2019-0009235, filed on Jan. 24, 2019, in the Korean Intellectual Property Office, and all the benefits accruing therefrom under 35 U.S.C. § 119, the content of which is incorporated herein by reference in its entirety.

BACKGROUND

1. Field

The present disclosure relates to a cathode, a lithium-air battery including the cathode, and a method of manufacturing the lithium-air battery.

2. Description of the Related Art

A lithium-air battery utilizes lithium as an anode active material and air as a cathode active material, and thus may be implemented as a high-capacity battery without the need to store air inside the battery.

A lithium-air battery has a theoretical specific energy of about 3,500 Watt hours per kilogram (Wh/kg) or greater, which is about 10 times greater than the theoretical specific energy of a lithium ion battery.

A cathode of a lithium-air battery may be manufactured by mixing a carbonaceous conducting agent, an ionic liquid electrolyte, a binder, or the like. However, there remains a need for a cathode for a lithium-air battery, having improved lifetime characteristics and capacity characteristics.

SUMMARY

Provided is a cathode having improved capacity characteristics.

Provided is a lithium-air battery including the cathode.

Provided is a method of manufacturing the lithium-air battery.

Provided is another method of manufacturing the lithium-air battery.

Additional aspects will be set forth in part in the description which follows and, in part, will be apparent from the description, or may be learned by practice of the presented embodiments.

According to an aspect of an embodiment, a cathode includes a mixed conductive layer, wherein the mixed conductive layer includes a core-shell structured particle including a core portion including a solid electrolyte, and a shell portion including an electronic conductor, wherein the cathode is configured to use oxygen as a cathode active material.

According to an aspect of an embodiment, a lithium-air battery includes: an anode including lithium or a lithium alloy; the cathode; and an electrolyte layer between the cathode and the anode.

According to an aspect of an embodiment, a method of manufacturing a lithium-air battery includes: coating a slurry on a solid electrolyte layer to provide a coated solid electrolyte layer, wherein the slurry includes a plurality of solid electrolyte particles and at least one of a pore former or a binder; thermally treating the coated solid electrolyte layer; and depositing an electronic conductor on the coated solid electrolyte layer after the thermal treatment to form an electronic conductor coating layer on each of the plurality of solid electrolyte particles.

According to an aspect of an embodiment, a method of manufacturing a lithium-air battery includes: providing a slurry including a plurality of coated solid electrolyte particles and at least one of a pore former or a binder; coating the slurry on a solid electrolyte layer to provide a coated solid electrolyte layer; and thermally treating the coated solid electrolyte layer.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
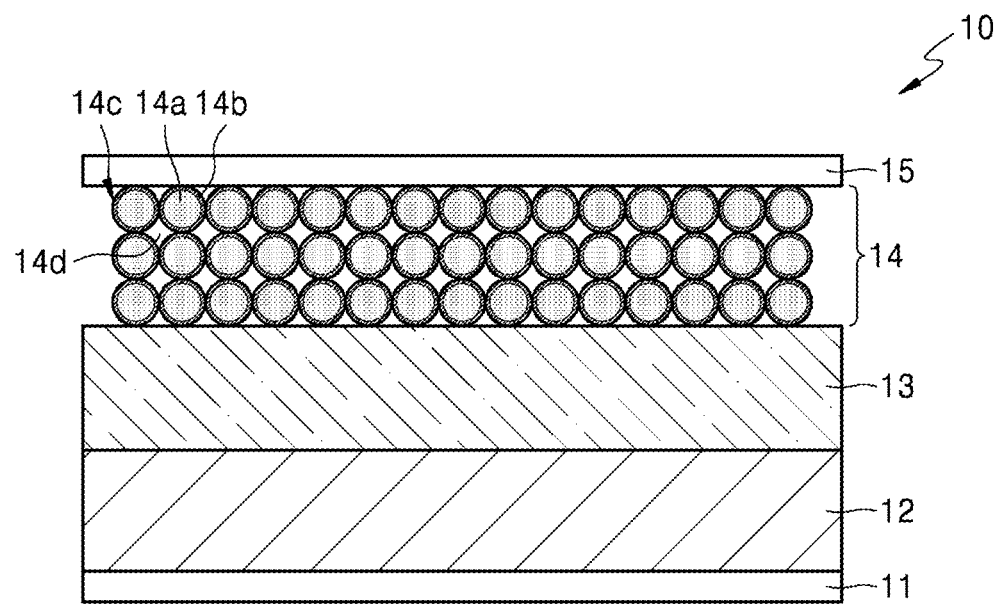
FIG. 1 is a schematic cross-sectional view illustrating a structure of a lithium-air battery, according to an embodiment.

The present inventive concept will now be described more fully hereinafter with reference to the accompanying drawings, in which various embodiments are shown. The present inventive concept may, however, be embodied in many different forms, should not be construed as being limited to the embodiments set forth herein, and should be construed as including all modifications, equivalents, and alternatives within the scope of the present inventive concept. Rather, these embodiments are provided so that this disclosure will be thorough and complete, and will fully convey the scope of the invention to those skilled in the art.

The terminology used herein is for the purpose of describing particular embodiments only and is not intended to be limiting. As used herein, "a," "an," "the," and "at least one" are do not denote a limitation of quantity, and are intended to cover both the singular and plural, unless the context clearly indicates otherwise. For example, "an element" has the same meaning as "at least one element," unless the context clearly indicates otherwise. "Or" means "and/or." As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The sign "/" used herein may be construed as meaning "and" or "or" unless otherwise indicated.

Relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. In contrast, when an element is referred to as being "directly on" another element, there are no intervening elements present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a carbonaceous conducting agent and an ionic liquid electrolyte are used to prepare a cathode for a lithium-air battery, the ionic liquid electrolyte may become deficient due to migration of the ionic liquid electrolyte from the cathode during charge and discharge of the lithium-air battery, and the lifetime of the lithium-air battery may deteriorate due to the generation of lithium carbonate ($Li_2CO_3$) through irreversible oxidation of the carbonaceous conducting agent. In addition, the generation of radicals from electrochemical reactions, which occur during charge and discharge of the lithium-air battery, may result in the decomposition of the carbonaceous conducting agent, the binder, and the like, in the cathode. Accordingly, a lithium-air battery including such a cathode may easily deteriorate and have a reduced lifetime.

Hereinafter, an embodiment of a cathode and a lithium-air battery including the cathode will be described in greater detail.

According to an aspect of the disclosure, there is provided a cathode including a mixed conductive layer, wherein the mixed conductive layer includes a core-shell structured particle having a core portion including a solid electrolyte and a shell portion including an electronic conductor, wherein the cathode is configured to use oxygen as a cathode active material.

As described above, in a cathode of a lithium-air battery which includes a carbonaceous conducting agent, an ionic liquid electrolyte, or the like, the ionic liquid electrolyte in the cathode may become depleted due to migration of the ionic liquid electrolyte from the cathode. As a result, the lifetime of the lithium-air battery may be reduced due to generation of lithium carbonate ($Li_2CO_3$) through irreversible oxidation of the carbonaceous conducting agent. As an approach to solving these problems, an all-solid air battery including an electron conducting layer including a electronic conductor, instead of a carbonaceous conducting agent and an ionic liquid electrolyte, has been produced. However, this type of all-solid air battery suffers from deteriorated capacity characteristics caused by an insufficient specific surface area of a cathode.

It has been unexpectedly discovered that a cathode including a mixed conductive layer including a core-shell structured particle having a core portion including a solid electrolyte and a shell portion including an electronic conductor, may have an increased specific surface area as compared with a thin film cathode and improved lifetime characteristics, thereby solving the capacity reduction problem.

For example, the core-shell structured particle may have a structure in which the entire surface of the core portion is coated by the shell portion. For example, the core-shell structured particle may have a structure in which the surface of the core portion is partially coated by the shell portion. For example, at least about 75%, or at least about 80%, or at least about 90%, or at least about 95%, or at least about 99%, or 100%, e.g., about 75% to 100%, or about 80% to about 98%, or about 85% to about 95%, of the surface of the core portion may be coated by the shell portion.

In an embodiment, the solid electrolyte may include at least one of a solid electrolyte including an ionically conductive inorganic material, a solid electrolyte including a polymeric ionic liquid (PIL) and a lithium salt, or a solid electrolyte including an ionically conductive polymer and a lithium salt. However, the disclosed embodiment is not limited thereto. Any suitable solid electrolyte suitable for use in a lithium-air battery may be used.

For example, the ionically conductive inorganic material may include at least one of a glass metal ion conductor, an amorphous metal ion conductor, a ceramic active metal ion conductor, or a glass-ceramic active metal ion conductor. For example, the ionically conductive inorganic material may be a suitable ionically conductive inorganic particle or a product thereof formed in a sheet form.

For example, the ionically conductive inorganic material may be at least one of $BaTiO_3$, $Pb(Zr_aTi_{1-a})O_3$ wherein $0 \leq a \leq 1$ (PZT), $Pb_{1-x}La_xZr_{1-y}Ti_yO_3$ (PLZT) (wherein $0 \leq x' < 1$ and $0 \leq y' < 1$), $Pb(Mg_3Nb_{2/3})O_3$-$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate (($Li_{x'}Ti_{y'}(PO_4)_3$, wherein $0 < x' < 2$, and $0 < y' < 3$), lithium aluminum titanium phosphate (($Li_{x'}Al_{y'}Ti_{z'}(PO_4)_3$, wherein $0 < x' < 2$, $0 < y' < 1$, and $0 < z' < 3$), $Li_{1+x'+y'}(Al_a, Ga_{1-a})_x(Ti_b, Ge_{1-b})_{2-x}Si_yP_{3-y}O_{12}$ (wherein $0 \leq x' \leq 1$, $0 \leq y' \leq 1$, $0 \leq a \leq 1$, and $0 \leq b \leq 1$), lithium lanthanum titanate ($Li_xLa_yTiO_3$, wherein $0 < x' < 2$ and $0 < y' < 3$), lithium lanthanum titanate ($Li_xGe_yP_zS_{w'}$, wherein $0 < x' < 4$, $0 < y' < 1$, $0 < z' < 1$, and $0 < w' < 5$), lithium nitride ($Li_xN_{y'}$, wherein $0 < x' < 4$, and $0 < y' < 2$), $SiS_2$-based glass ($Li_xSi_yS_{z'}$, wherein $0 < x' < 3$, $0 < y' < 2$, and $0 < z' < 4$), $P_2S_5$-based glass ($Li_xP_yS_{z'}$, $0 < x' < 3$, $0 < y' < 3$, and $0 < z' < 7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, wherein M=Te, Nb, or Zr, and $0 \leq x \leq 1$), or a combination thereof.

In an embodiment, the solid electrolyte may include a lithium-ion-conductive glass, a lithium-ion-conductive crystal (e.g., a lithium-ion-conductive ceramic or a lithium-ion-conductive glass-ceramic), or a combination thereof. In view of chemical stability, the solid electrolyte may include an oxide. When the solid electrolyte includes a large amount of a lithium-ion-conductive crystal, improved ionic conductivity may be obtained. For example, the amount of the lithium-ion-conductive crystal may be about 50 weight percent (wt %) or greater, about 55 wt % or greater, or about 60 wt % or greater, or about 50 wt % to about 95 wt %, or about 55% to about 85 wt %, or about 60 wt % to about 80 wt %, based on a total weight of the solid electrolyte. For example, the lithium-ion-conductive crystal may be a crystal having a perovskite structure and lithium-ion conductivity, for example, $Li_3N$, a lithium super ion conductor (LISICON), La0.55Li0.35TiO$_3$, $LiTi_2P_3O_{12}$ having a sodium super ion conductor (NASICON)-type structure, or a glass-ceramic in which the lithium-ion-conductive crystal is deposited. For example, the lithium-ion-conductive crystal may be $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$, and $0 \leq b \leq 1$, for example, $0 \leq x \leq 0.4$ and $0 < y \leq 0.6$, or $0.1 \leq x \leq 0.3$ and $0.1 < y \leq 0.4$).

To have increased ionic conductivity, the lithium-ion-conductive crystal does not have a grain boundary that may interrupt ionic conduction. For example, a lithium-ion-conductive glass-ceramic having substantially no pore or grain boundary which interrupts ionic conduction, may have high ionic conductivity and good chemical stability. For example, the lithium-ion-conductive glass-ceramic may be lithium-aluminum-germanium-phosphate (LAGP), lithium-aluminum-titanium-phosphate (LATP), lithium-aluminum-titanium-silicon-phosphate (LATSP), or a combination thereof. For example, when a parent glass having the composition of $Li_2O$—$Al_2O_3$—$TiO_2$—$SiO_2$—$P_2O_5$ is crystallized by thermal treatment, the resulting main crystal phase may be $Li_{1+x+y}Al_xTi_{2-x}Si_yP_{3-y}O_{12}$ (wherein $0 \leq x \leq 2$ and $0 \leq y \leq 3$). For example, in the formula of $Li_{1+x+y}Al_xTi_{2-x}Si_yP_{3-y}O_{12}$, x and y may satisfy the conditions of, for example, $0 \leq x \leq 0.4$ and $0 < y \leq 0.6$; or $0.1 \leq x \leq 0.3$ and $0.1 < y \leq 0.4$. A lithium-ion-conductive crystal having a pore or grain boundary which interrupts ionic conduction, is an ionic conduction-interrupting material in which a total conductivity of the lithium-ion-conductive crystal is reduced to a level of one-tenth (1/10) or less of the conductivity of the lithium-ion-conductive crystal in the absence of a pore or grain boundary.

For example, the solid electrolyte may include at least one of lithium-aluminum-germanium-phosphate (LAGP), lithium-aluminum-titanium-phosphate (LATP), or lithium-aluminum-titanium-silicon-phosphate (LATSP).

For example, the polymeric ionic liquid (PIL) may include a repeating unit including a cation and an anion. The cation may be at least one of an ammonium-based cation, a pyrrolidinium-based cation, a pyridinium-based cation, a pyrimidinium-based cation, an imidazolium-based cation, a piperidinum-based cation, a pyrazolium-based cation, an oxazolium-based cation, a pyridazinium-based cation, a phosphonium-based cation, a sulfonium-based cation, a triazolium-based cation, or a combination thereof. The anion may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, $(CF_3SO_2)_2N^-$, or a combination thereof.

For example, the polymeric ionic liquid (PIL) may be poly(diallyldimethylammonium) bis(trifluoromethanesulfonyl)imide) (TFSI)), poly(1-allyl-3-methylimidazolium bis(trifluoromethanesulfonyl)imide), poly((N-methyl-N-propylpiperidinium bis(trifluoromethanesulfonyl)imide, or a combination thereof.

The ionically conductive polymer may include an ion conductive repeating unit which is at least one of an ether-based monomer, an acryl-based monomer, or a siloxane-based monomer. "Acryl" includes acrylic, methacrylic, (C1 to C20 alkyl)acrylate, and (C1 to C20alkyl)methacrylate.

The ionically conductive polymer may include, for example, polyethylene oxide (PEO), polyvinyl alcohol (PVA), polyvinyl pyrrolidone (PVP), polyvinyl sulfone, polypropylene oxide (PPO), polymethylmethacrylate, polyethylmethacrylate, polydimethylsiloxane, polyacrylic acid, polymethacrylic acid, poly(methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride (PVdF), Li-substituted Nafion, or a combination thereof. However, embodiments are not limited thereto. Any suitable ionically conductive polymer may be used.

The electronic conductor included in the mixed conductive layer refers to a material having electronic conductivity. For example, the electronic conductor may be an inorganic electronic conductor.

For example, the electronic conductor may be a metal, a metal oxide, or a combination thereof. For example, the electronic conductor may be a metal.

For example, the electronic conductor may be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, Pb, or an oxide thereof. For example, the electronic conductor may be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb.

In an embodiment, the shell portion may have an average thickness of about 10 nanometers (nm) or less, or about 7.5 nm or less, or about 5 nm or less, or about 2 nm or less. For example, the shell portion may have an average thickness of about 0.1 nm to about 10 nm, or about 0.5 nm to about 10 nm, or an average thickness of about 1 nm to about 10 nm. For example the shell may have an average thickness of about 0.1 nm to about 7.5 nm, or about 0.1 nm to about 5 nm, or about 1 nm to about 5 nm.

When the average thickness of the shell portion is greater than 10 nm, exceeding the above-described ranges, this leads to a reduced capacity per weight of a lithium-air battery and an interruption in the conduction of lithium ions.

In an embodiment, the mixed conductive layer may be porous. For example, the mixed conductive layer may have a porosity of about 5% to about 80%, or about 10% to about 75%, or about 20% to about 60%, based on the total volume of the mixture conductive layer. As used herein the term "porosity" is used to refer to a measure of the empty space (i.e., voids or pores) in a material and is determined as a percentage of the volume of voids in a material based on the total volume of the material.

In an embodiment, the mixed conductive layer may have lithium-ion conductivity. Accordingly, the cathode including the mixed conductive layer may not need to further include an electrolyte, with the ability to transfer lithium ions and electrons involved in production of a discharge product during discharging of a lithium-air battery.

For example, the mixed conductive layer may have an electronic conductivity of about $1.0 \times 10^{-6}$ Siemens per centimeter (S/cm) or greater.

For example, the mixed conductive layer may have an electronic conductivity of about $2.0 \times 10^{-6}$ S/cm or greater, about $4.0 \times 10^{-6}$ S/cm or greater, about $5.0 \times 10^{-6}$ S/cm or greater, about $1.0 \times 10^{-5}$ S/cm or greater, about $2.0 \times 10^{-5}$ S/cm or greater, about $4.0 \times 10^{-5}$ S/cm or greater, about $5.0 \times 10^{-5}$ S/cm or greater, about $1.0 \times 10^{-4}$ S/cm or greater, or about $2.0 \times 10^{-4}$ S/cm or greater. Due to the mixed conductive layer having such a high electronic conductivity, each of the cathode and a lithium-air battery including the mixed conductive layer may have reduced internal resistance.

For example, the mixed conductive layer may have an electronic conductivity of about $1.0 \times 10^{-6}$ S/cm to about $1.0 \times 10^{1}$ S/cm, about $2.0 \times 10^{-6}$ S/cm to about $1.0 \times 10^{1}$ S/cm, about $2.0 \times 10^{-6}$ S/cm to about 5.0 S/cm, about $4.0 \times 10^{-6}$ S/cm to about 5.0 S/cm, about $4.0 \times 10^{-6}$ S/cm to about 1.0 S/cm, about $5.0 \times 10^{-6}$ S/cm to about 1.0 S/cm, about $1.0 \times 10^{-5}$ S/CM to about 1.0 S/cm, about $2.0 \times 10^{-5}$ S/cm to about 1.0 S/cm, about $4.0 \times 10^{-5}$ S/cm to about 1.0 S/cm, about $5.0 \times 10^{-5}$ S/cm to about 1.0 S/cm, about $1.0 \times 10^{-4}$ S/cm to about 1.0 S/cm, about $2.0 \times 10^{-4}$ S/cm to about 1.0 S/cm, about $2.0 \times 10^{-4}$ S/cm to about $5.0 \times 10^{-1}$ S/cm, or about $2.0 \times 10^{-4}$ S/cm to about $1.0 \times 10^{-1}$ S/cm.

For example, the mixed conductive layer may have an ionic conductivity of about $1.0 \times 10^{-4}$ S/cm or greater.

For example, the mixed conductive layer may have an ionic conductivity of about $2.0 \times 10^{-4}$ S/cm or greater, about $4.0 \times 10^{-4}$ S/cm or greater, about $5.0 \times 10^{-4}$ S/cm or greater, about $1.0 \times 10^{-3}$ S/cm or greater, about $2.0 \times 10^{-3}$ S/cm or greater, about $4.0 \times 10^{-3}$ S/cm or greater, about $5.0 \times 10^{-3}$ S/cm or greater, about $1.0 \times 10^{-2}$ S/cm or greater, or about $2.0 \times 10^{-2}$ S/cm or greater. Due to the mixed conductive layer having such a high ionic conductivity, each of the cathode and a lithium-air battery including the mixed conductive layer may have reduced internal resistance.

For example, the mixed conductive layer may have an ionic conductivity of about $1.0 \times 10^{-4}$ S/cm to about $1.0 \times 10^{1}$ S/cm, about $2.0 \times 10^{-4}$ S/cm to about $1.0 \times 10^{1}$ S/cm, about $2.0 \times 10^{-4}$ S/cm to about 5.0 S/cm, about $4.0 \times 10^{-4}$ S/cm to about 5.0 S/cm, about $4.0 \times 10^{-4}$ S/cm to about 1.0 S/cm, about $5.0 \times 10^{-4}$ S/cm to about 1.0 S/cm, about $1.0 \times 10^{-3}$ S/CM to about 1.0 S/cm, about $2.0 \times 10^{-3}$ S/cm to about 1.0 S/cm, about $4.0 \times 10^{-3}$ S/cm to about 1.0 S/cm, about $5.0 \times 10^{-3}$ S/cm to about 1.0 S/cm, about $1.0 \times 10^{-2}$ S/cm to about 1.0 S/cm, about $2.0 \times 10^{-2}$ S/cm to about 1.0 S/cm, about $2.0 \times 10^{-2}$ S/cm to about $5.0 \times 10^{-1}$ S/cm, or about $2.0 \times 10^{-2}$ S/cm to about $1.0 \times 10^{-1}$ S/cm.

Accordingly, due to the mixed conductive layer having both ionic conductivity and electronic conductivity at the same time, the cathode may be implemented without the separate use of a conducting agent and an electrolyte.

In an embodiment, the mixed conductive layer may have a thickness of about 1 micrometer (μm) to about 1 millimeter (mm). For example, the mixed conductive layer may have a thickness of about 3 μm to about 900 μm, about 3 μm to about 500 μm, about 3 μm to about 300 μm, or about 5 μm to about 300 μm.

According to another aspect of the disclosure, a lithium-air battery includes: an anode including lithium or a lithium alloy; an electrolyte layer on the cathode; and the cathode according to any of the above-described embodiments on the electrolyte layer.

In an embodiment, the electrolyte layer may be substantially non-porous.

The term "non-porous" used herein refers to an electrolyte layer includes less than about 0.1 volume percent (vol %) of pores, for example, less than 0.01 vol % or less than 0.001 vol % of pores, based on a total volume of the electrolyte layer.

In an embodiment, the electrolyte layer may include a solid electrolyte. For example, the electrolyte layer may be a solid electrolyte layer.

FIG. 1 is a schematic cross-sectional view illustrating a structure of a lithium-air battery 10 according to an embodiment. Referring to FIG. 1, the lithium-air battery 10 according to an embodiment may include a first current collector 11, an anode 12 including lithium or a lithium alloy, a solid electrolyte layer 13 on the anode 12, a cathode 14 on the solid electrolyte layer 13, and a second current collector 15 on the cathode 14. The cathode 14 may include a plurality of core-shell structured particles 14c each having a core portion 14a including a solid electrolyte, and a shell portion 14b including an electronic conductor.

The plurality of core-shell structured particles 14c in the cathode 14 may be disposed with pores 14d therebetween, and the cathode 14 may be porous.

For example, the solid electrolyte in the solid electrolyte layer 13, and the solid electrolyte in the core portion 14a of the core-shell structured particles 14c may be the same or different from one another. For example, the solid electrolyte in the solid electrolyte layer 13 may be the same as or different from the solid electrolyte in the core portion 14a.

In an embodiment, the solid electrolyte layer 13 may include an organic layer and a plurality of solid electrolyte particles, wherein the organic layer may be a composite layer including a crosslinked copolymer.

Figure 2:
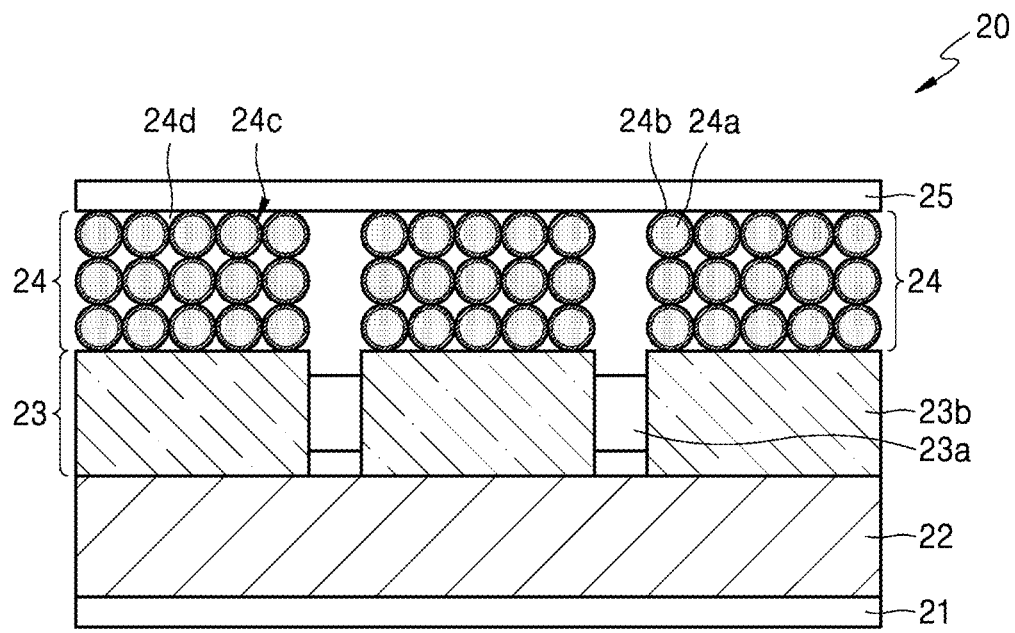
FIG. 2 is a schematic cross-sectional view illustrating a structure of a lithium-air battery, according to another embodiment.

FIG. 2 is a schematic cross-sectional view illustrating a structure of a lithium-air battery 20 according to another embodiment. Referring to FIG. 2, the lithium-air battery 20 may include a first current collector 21, an anode 22 including lithium or a lithium alloy, an electrolyte layer 23 on the anode 22, a cathode 24 on the electrolyte layer 23, and a second current collector 25. The electrolyte layer 23 may be a composite layer including a portion including an organic layer 23a and a portion including the plurality of solid electrolyte particles 23b. For example, portion including the organic layer 23a and the portion including the plurality of solid electrolyte particles 23b may be disposed adjacent to one another in a horizontal direction.

For example, the organic layer 23a may have moisture and gas blocking characteristics. A detailed description of the organic layer 23a will be provided later.

The cathode 24 is disposed on the portion of the electrolyte membrane including the plurality of solid electrolyte particles, and includes a plurality of mixed conductive layers 24d. The plurality of mixed conductive layers 24d may be disposed on the plurality of solid electrolyte particles 23b. Each of the plurality of mixed conductive layers 24b includes a core-shell structured particle 24c including a core portion 24a including a solid electrolyte, and a shell portion 24b including an electronic conductor. The plurality of mixed conductive layers 24d are disposed on the portion including the plurality of solid electrolyte particles 23b, and not on the portion including the organic layer 23a Due to the arrangement of the plurality of mixed conductive layers 24d selectively on the plurality of solid electrolyte particles 23b, and not on the organic layer 23a, the lithium-air battery may maintain capacity while having a reduced total weight, and have a significantly improved capacity per weight, as compared with a lithium-air battery including a thick, dense solid electrolyte layer disposed on the cathode.

In an embodiment, an electronic conductor may be disposed on the electrolyte layer.

In an embodiment, the organic layer may be a polymer layer including at least one of a homopolymer, a block copolymer, a random copolymer, or a combination thereof.

The polymer which forms the organic layer may be selected from a variety of polymers according to the use of the organic layer.

When the polymer has barrier properties and is capable of blocking at least one of a gas (e.g., oxygen), water (moisture), or a combination thereof, the organic layer may be capable of blocking, for example, an anode corrosive gas. The anode corrosive gas may be, for example, water vapor, carbon dioxide, oxygen, or a combination thereof. Accordingly, the organic layer may function as an oxygen barrier membrane, a moisture barrier membrane, a carbon dioxide barrier membrane, or a combination thereof.

The polymer capable of blocking gas, water, or a combination thereof may be, for example, a polymerization product of a polymerizable non-aqueous floating compound.

The polymerizable non-aqueous floating compound may include a polymerizable organic monomer which floats in water, has non-volatile and non-aqueous characteristics, and has at least two polymerizable functional groups. The polymerization may include both copolymerization and cross-linking. For example, the polymerizable non-aqueous floating compound may include: i) a polymerization product of at least one polyfunctional monomer; or ii) a polymerization product of at least one polyfunctional monomer with a polythiol having 3 or 4 thiol groups. The at least one polyfunctional monomer may include a polyfunctional acryl monomer, a polyfunctional vinyl monomer, or a combination thereof.

As used herein, the term "polyfunctional monomer" refers to a monomer including more than one functional group. The functional group may be, for example, an acryl group or a vinyl group.

As used herein, an "acryl" group includes acrylic, methacrylic, (C1 to C20 alkyl)acrylate, and (C1 to C20 alkyl) methacrylate.

As used herein, a vinyl monomer refers to a monomer including a vinyl group. A "vinyl" group includes any group having terminal unsaturation ($-CH_2=CH_2$), including acrylate groups ($-OC(O)CH=CH_2$) and methacrylate ($-OC(O)(CH_3)=CH_2$) groups The polymerizable non-aqueous floating compound may refer to a hydrophobic compound.

The polyfunctional acrylic monomer may be at least one of diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, or bisphenol A diacrylate.

Non-limiting examples of the polyfunctional vinyl monomer are 1,3,5-triallyl-1,3,5-triazine-2,4,6-trione, 3-methacrylpropyltrimethoxysilane, or a combination thereof.

The polythiol may be, for example, at least one of pentaerythritol tetrakis(3-mercaptopropionate), trimethylolpropane tris(3-mercaptopropionate), 4-mercaptomethyl-3,6-dithia-1,8-octanedithiol, pentaerythritol tetrakis(2-mercaptoacetate), or trimethylolpropane tris(2-mercaptoacetate).

The organic layer may include a polymerization product of pentaerythritol tetrakis(3-mercaptopropionate) and 1,3,5-triallyl-1,3,5-triazine-2,4,6-trione.

The polymerizable non-aqueous floating compound may have a water solubility of about 0.0001 grams per liter (g/L) to about 0.025 g/L. When the polymerizable non-aqueous floating compound is pentaerythritol tetrakis(3-mercaptopropionate), the compound may have a water solubility of about 0.00369 g/l. When the polymerizable non-aqueous floating compound is 1,3,5-triallyl-1,3,5-triazine-2,4,6-trione (TTT), the compound may have a water solubility of about 0.001 g/l. When the polymerizable non-aqueous floating compound is trimethylolpropane trimethacrylate, the compound may have a water solubility of about 0.0201 g/L.

In the organic layer according to an embodiment, since the polymer has barrier properties and is capable of blocking at least one of a gas (e.g., oxygen, $CO_2$), water (moisture), or a combination thereof, the organic layer including the polymer may also have characteristics of blocking, for example, an anode corrosive gas. The anode corrosive gas may be, for example, water vapor, carbon dioxide, oxygen, or the like. Accordingly, the organic layer may function as an oxygen barrier membrane, a moisture blocking membrane, a carbon dioxide barrier membrane, or a combination thereof. As a result, the electrolyte layer including the organic layer may also have moisture and/or gas blocking characteristics.

In the organic layer according to an embodiment, the organic layer may have a gas permeability of about $10^{-3}$ to about 2,000 cubic centimeters per square meter per day ($cm^3/m^2$ day) as measured at 1 atmosphere (atm). The term "gas" as used herein refers to oxygen and carbon dioxide. The term "gas permeability" refers to, for example, an oxygen permeability or a carbon dioxide permeability. The term "moisture permeability" refers to moisture permeability or water vapor permeability.

In an embodiment, the organic layer may be a foldable flexible membrane. Due to the organic layer having flexibility, the composite layer including the organic layer may be applicable to a folding cell.

In an embodiment, the organic layer may have a tensile strength of about 10 megapascals (MPa) or greater, about 15 MPa or greater, about 20 MPa or greater, about 25 MPa or greater, about 30 MPa or greater, about 35 MPa or greater, about 40 MPa or greater, or about 45 MPa or greater. For example, the organic layer may have a tensile strength of about 10 MPa to about 60 MPa, or about 15 MPa, to about 50 MPa, or about 20 MPa to about 40 MPa. When the organic layer has a tensile strength within these ranges, the organic layer may provide improved mechanical properties. For example, the organic layer may have a yield strain of about 1% or greater, about 1.5% or greater, about 2% or greater, or about 2.5% or greater, or about 1% to about 5%, or about 1.5% to about 4%, or about 2% to about 3%. When the organic layer has a yield strain within these ranges, the organic layer may be substantially flexible enough to be bendable or foldable, and thus be applicable for various purposes.

In an embodiment, the organic layer may have a swelling ratio of about 30% or less, about 25% or less, about 20% or less, about 15% or less, about 10% or less, or about 5% or less, or about 1% to about 30%, or about 2% to about 25%, or about 5% to about 15%, after impregnation in an electrolyte solution at about 80° C. for about 24 hours. Due to the organic layer having such a low swelling rate in electrolyte solution, deterioration such as cracking of the composite layer including the organic layer may be suppressed when the composite layer contacts an electrolyte solution for a long time. For example, cracking of the organic layer may be suppressed even when a lithium battery including the organic layer is charged and discharged for a long period of time.

In an embodiment, the organic layer may include a plurality of through holes, wherein a plurality of solid electrolyte particles may be disposed in the through holes.

In an embodiment, the lithium-air battery may include a cathode. The cathode may be an air electrode.

The cathode may include the mixed conductive layer as described above. An amount of the mixed conductive layer in the cathode may be, for example, in a range of about 1 part by weight to about 100 parts by weight, about 10 parts by weight to about 100 parts by weight, about 50 parts by weight to about 100 parts by weight, about 60 parts by weight to about 100 parts by weight, about 70 parts by weight to about 100 parts by weight, about 80 parts by weight to about 100 parts by weight, or about 90 parts by weight to about 100 parts by weight, each with respect to 100 parts by weight of the cathode. In an embodiment, the cathode may comprise, consist essentially of, or consist of the mixed conductive layer. In manufacturing the cathode, a pore former may be used to incorporate pores into the cathode. The cathode may be, for example, porous. For example, the cathode may be in the form of porous pellet or porous sheet. However, the form of the cathode is not limited thereto. The cathode may have any shape according to an intended shape of the battery. When the cathode consists essentially of or consists of the mixed conductive layer, the cathode may have a simplified structure and be easily manufactured. For example, the cathode may be permeable to gas such as oxygen, air, or the like. Accordingly, the cathode according to an embodiment may be distinguished from a cathode that is substantially impermeable to gas such as oxygen, air, or the like, and conducts only ions (i.e., does not have electronic conductivity). Since the cathode according to an embodiments is porous and/or gas permeable, oxygen, air, or the like may be diffuse easily into the cathode, and lithium ions and/or electrons may easily migrate through the mixed conductive layer in the cathode, so that electrochemical reactions in the cathode which depend upon oxygen, lithium ions, and/or electrons, may be facilitated.

In an embodiment, the cathode may further include an additional cathode material, in addition to the mixed conductive layer.

For example, the cathode may further include an electronic conductive material. For example, the conductive material may be porous. Due to porosity of the conductive material, air permeation into the cathode may be facilitated. Any suitable conductive material having suitable porosity and/or electronic conductivity available in the art may be used. For example, the conductive material may be a porous carbonaceous material. For example, the porous carbonaceous material may be carbon black, graphite, graphene, activated carbon, carbon fibers, or a combination thereof. However, embodiments are not limited thereto. For example, the conductive material may be a metallic material such as a metal fiber, metal mesh, or the like. For example, the metallic material may be a metal powder, for example, copper, silver, nickel, and/or aluminum in powder form. For example, the conductive material may be an organic conductive material, for example, a polyphenylene derivative or a polythiophene derivative. For example, the above-listed conductive materials may be used alone or in a combination thereof. For example, the cathode may include a composite conductor as the conductive material. For example, the cathode may further include any of the above-listed conductive materials, in addition to a composite conductor.

In an embodiment, the cathode may further include a catalyst for oxidation/reduction of oxygen. Examples of the catalyst may include: a precious metal-based catalyst such as platinum, gold, silver, palladium, ruthenium, rhodium, and osmium; an oxide-based catalyst such as manganese oxide, iron oxide, cobalt oxide, and nickel oxide; and an organic metal-based catalyst such as cobalt phthalocyanine. However, embodiments are not limited thereto. Any catalyst suitable for oxidation/reduction of oxygen may be used.

In an embodiment, the catalyst may be disposed on a catalyst support. The catalyst support may be an oxide, a zeolite, a clay-based mineral, carbon, or a combination thereof. The oxide may be a metal oxide including at least one of aluminum (Al), silicon (Si), zirconium (Zr), titanium (TiO, cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), or tungsten (W). For example, the oxide as the catalyst support may include alumina, silica, zirconium oxide, titanium dioxide, or a combination thereof. Examples of carbon as the catalyst support may include a carbon black such as Ketjen black, acetylene black, channel black, or lamp black; a graphite such as natural graphite, artificial graphite, or expandable graphite; an activated carbon; and a carbon fiber. However, embodiments are not limited thereto. Any suitable catalyst support available in the art may be used. A combination comprising at least one of the foregoing may also be used.

In an embodiment, the cathode may not include a polymer such as a binder. This is because the binder may be melted when thermal treatment is performed during a method of manufacturing a lithium-air battery, which will be described below.

The lithium-air battery according to an embodiment may include an anode. The anode may include lithium.

The anode may be, for example, a lithium metal thin film or a lithium-based alloy thin film. The lithium-based alloy may be, for example, an alloy of lithium with aluminum, tin, magnesium, indium, calcium, titanium, or vanadium.

The lithium-air battery according to an embodiment may include an electrolyte layer (solid electrolyte layer) between the cathode and the anode. The above-detailed description of the solid electrolyte layer as the core of the core-shell particle of the mixed conductive layer included in the cathode, according to the disclosed embodiment, may apply to the plurality of solid electrolyte particles in the electrolyte layer between the cathode and the anode.

In an embodiment, the lithium-air battery may further include a gel electrolyte or a liquid electrolyte, in addition to the solid electrolyte layer.

In an embodiment, the gel electrolyte may be obtained, for example, by adding a low-molecular weight solvent to a solid electrolyte interposed between the cathode and the anode. The gel electrolyte may be a gel electrolyte obtained by further adding a low-molecular weight organic compound such as a solvent, an oligomer, or the like to a polymer. The gel electrolyte may be a gel electrolyte obtained by further adding a low-molecular weight organic compound such as a solvent or an oligomer to any of the above-listed polymer electrolytes.

In an embodiment, the liquid electrolyte may include a solvent and a lithium salt.

In an embodiment, the solvent may include at least one of an organic solvent, an ionic liquid, or an oligomer. However, embodiments are not limited thereto. The solvent may be any suitable solvent that is in a liquid form at room temperature (25° C.).

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn ~500), dimethyl ether, diethyl ether, dibutyl ether, dimethoxyethane, 2-methyltetrahydrofuran, or tetrahydrofuran. However, embodiments are not limited thereto. The organic solvent may be any suitable organic solvent that is in liquid form at room temperature.

The ionic liquid (IL) may include, for example, at least one cation and at least one anion. The cation may be at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof, and the anion may be at least one anion or $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, $(CF_3SO_2)_2N^-$, or a combination thereof.

The lithium salt may include at least one of LiTFSI, $LiPF_6$, $LiBF_4$, $LiAsF_6$, $LiClO_4$, $LiNO_3$, (lithium bis(oxalato)borate(LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate (LiTfO). However, embodiments are not limited thereto. Any suitable material available as a lithium salt may be used. A concentration of the lithium salt may be, for example, about 0.01 molar (M) to about 5.0 M.

In an embodiment, the lithium-air battery may further include a separator between the cathode and the anode. Any suitable separator may be used as long as it is durable under operation conditions of the lithium-air battery. For example, the separator may include a polymer non-woven fabric, for example, a non-woven fabric of polypropylene material or a non-woven fabric of polyphenylene sulfide; a porous film of an olefin resin such as polyethylene or polypropylene; or glass fiber. These separators may be used in a combination of at least two or more.

In an embodiment, the electrolyte layer may have a structure in which a solid polymer electrolyte is impregnated in the separator, or a structure in which a liquid electrolyte is impregnated in the separator. For example, the electrolyte layer in which a solid polymer electrolyte is impregnated in the separator may be prepared by disposed a solid polymer electrolyte film on opposite surfaces of the separator, and roll-pressing them at the same time. For example, the electrolyte layer in which a liquid electrolyte is impregnated in the separator may be prepared by injecting a liquid electrolyte including a lithium salt into the separator.

According to another aspect of the disclosure, a method of manufacturing a lithium-air battery includes: coating a slurry on a solid electrolyte layer to provide a coated solid electrolyte layer, wherein the slurry includes a plurality of solid electrolyte particles and at least one of a pore former or a binder; thermally treating the coated solid electrolyte layer to provide a thermally treated coated solid electrolyte layer; and depositing an electronic conductor on the thermally treated coated solid electrolyte layer to form an electronic conductor coating layer on each of the plurality of solid electrolyte particles.

Figure 3A:
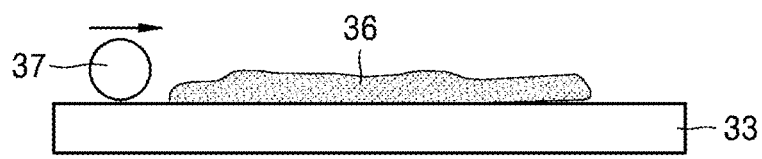
FIGS. 3A to 3C are schematic views for explaining a method of manufacturing a lithium-air battery, according to an embodiment.
Figure 3B:
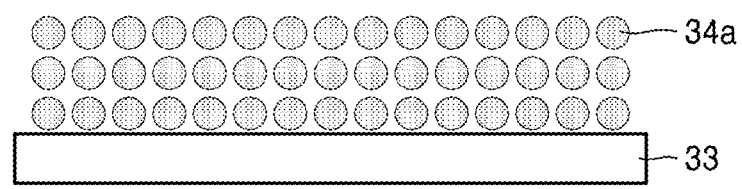
Figure 3C:
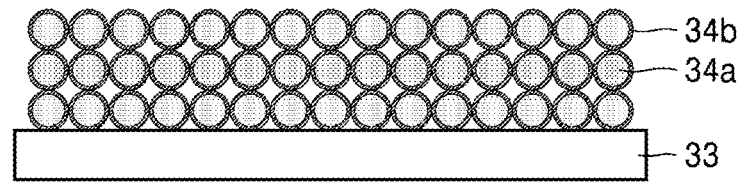

FIGS. 3A to 3C are schematic views for explaining a method of manufacturing a lithium-air battery, according to an embodiment. Referring to FIG. 3A, a slurry 36 including a plurality of solid electrolyte particles and at least one of a pore former or a binder may be coated on a solid electrolyte layer 33 by using a coater 37. The coating may be performed by, for example, bar coating, drop coating, or dip coating. However, embodiments are not limited thereto. Any suitable coating method may be used.

Next, the solid electrolyte layer 33 coated with the slurry 36 may be thermally treated to remove the pore former, such that only the plurality of solid electrolyte particles 34a may remain (FIG. 3B). While the pore former is removed, pores may be formed among the plurality of solid electrolyte particles 34a. The thermal treatment may be performed under any suitable conditions, as long as the pore former is able to be selectively removed and the solid electrolyte particles remain, for example, at a temperature of about 700° C. to about 1200° C., or about 800° C. to about 1,000° C., for about 4 hours to about 12 hours.

Then, an electronic conductor may be deposited on the solid electrolyte layer 33 including the plurality of solid electrolyte particles 34a arranged thereon, to thereby form an electronic conductor coating layer 34b on each of the plurality of the solid electrolyte particles 34a (FIG. 3C). The deposition may be performed by, for example, sputtering, chemical vapor deposition (CVD), or electroplating. However, embodiments are not limited thereto. Any suitable method available in the art may be used.

Furthermore, during the deposition of the electronic conductor on the solid electrolyte layer 33 including the plurality of solid electrolyte particles 34a disposed thereon, as described above, the electronic conductor coating layer 34b is formed on each of the plurality of solid electrolyte particles 34a, and is also deposited (coated) on portions of a surface of the solid electrolyte layer 33 (although not illustrated). Accordingly, a conductive effect may be further improved, thereby providing excellent battery characteristics.

For example, the solid electrolyte particles 34a and the solid electrolyte layer 33 may include the same type of solid electrolyte. For example, the plurality of solid electrolyte particles comprise a solid electrolyte which is the same as a solid electrolyte in the solid electrolyte layer.

The detailed descriptions of the solid electrolyte and the electronic conductor provided above apply here to the solid electrolyte and the electronic conductor used in connection with the manufacturing method.

For example, in the method of manufacturing the lithium-air battery according to the disclosed embodiment, after the anode is installed on an inner side of a case, the solid electrolyte layer 33 may be arranged on the anode, and then the slurry 36 may be coated on the solid electrolyte layer 33 to thereby form the cathode.

According to another aspect of the disclosure, a method of manufacturing the lithium-air battery according to the disclosed embodiment includes: providing a slurry including a plurality of coated solid electrolyte particles and at least one of a pore former or a binder; coating the slurry on a solid electrolyte layer; and thermally treating the solid electrolyte layer coated with the slurry. In the method, the plurality of coated solid electrolyte particles are formed by depositing an electronic conductor on a plurality of solid electrolyte particles.

Figure 4A:
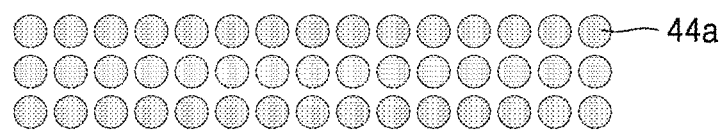
FIGS. 4A to 4D are schematic views for explaining a method of manufacturing a lithium-air battery, according to another embodiment.
Figure 4B:
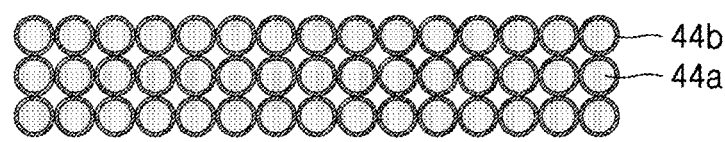

FIGS. 4A to 4D are schematic views for explaining a method of manufacturing a lithium-air battery, according to another embodiment. Referring to FIG. 4A and FIG. 4B, an electronic conductor may be deposited on the plurality of solid electrolyte particles 44a to thereby form electronic conductor coating layers 44b on the plurality of solid electrolyte particles 44a.

Figure 4C:
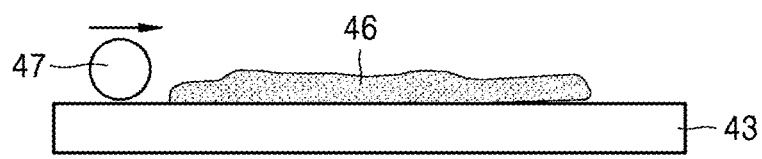

Then, a slurry 46 including at least one of a pore former or a binder and the plurality of solid electrolyte particles 44a with the electronic conductor coating layers 44b thereon may be coated on a solid electrolyte layer 43 by using a coater 47 (FIG. 4C).

Figure 4D:
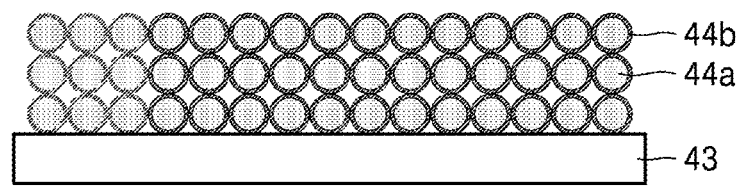

Next, the solid electrolyte layer 43 coated with the slurry 46 may be thermally treated to remove the pore former, so that only the plurality of solid electrolyte particles 44a with the electronic conductor coating layer 44b thereon may remain (FIG. 4D).

The detailed descriptions of the deposition, the coating, the solid electrolyte, and the electronic conductor provided above may apply to those mentioned herein in connection with the manufacturing method.

For example, in the method of manufacturing the lithium-air battery according to the disclosed embodiment, after the anode is installed on an inner side of a case, the solid electrolyte layer 43 may be arranged on the anode, and then the slurry 46 may be coated on the solid electrolyte layer 43 to thereby form the cathode.

The lithium-air battery according to the disclosed embodiment may be manufactured using any suitable method, and is not limited to the above-described methods.

In an embodiment, the lithium-air battery may be manufactured by installing the anode on an inner side of a case, sequentially disposing the electrolyte layer on the anode, the cathode on the electrolyte layer, and a cathode current collector on the cathode, and then disposing a pressing member on the cathode current collector to press a resulting cell structure with the pressing member so as to allow air to be transferred to the air electrode (i.e., cathode). The case may be divided into upper and lower portions which contact the air electrode and the anode, respectively. An insulating resin may be disposed between the upper and lower portions of the case to electrically insulate the cathode and the anode from one another.

The lithium-air battery according to the disclosed embodiment may be a lithium primary battery or a lithium secondary battery. The lithium-air battery may have any suitable shape of, for example, a coin, a button, a sheet, a stack, a cylinder, a plane, or a horn. However, embodiments are not limited thereto. The lithium-air battery may be used in a large battery for electric vehicles.

Figure 6:
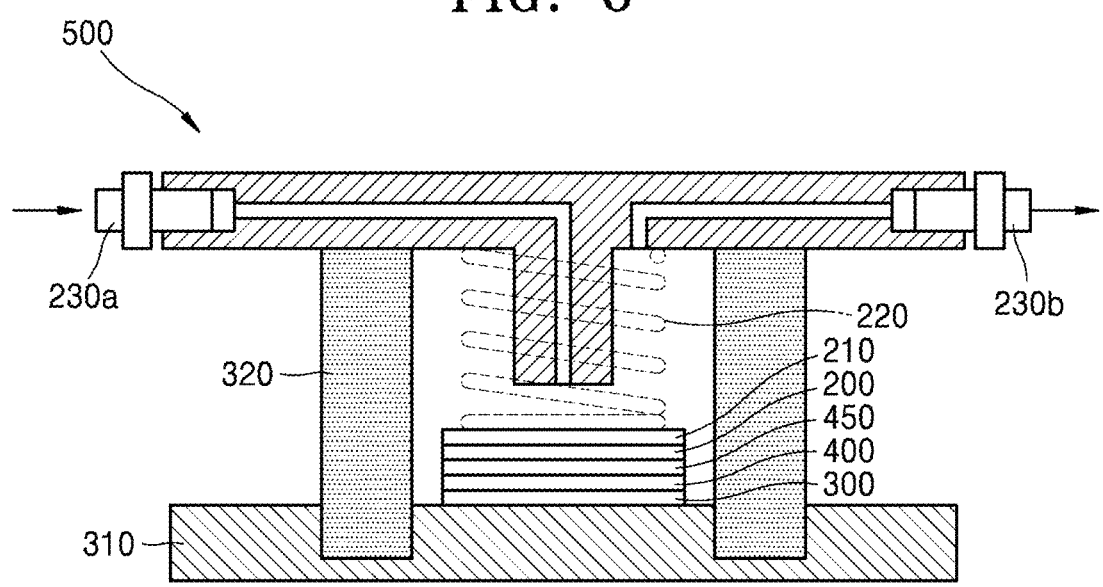
FIG. 6 is a schematic view illustrating a structure of a lithium-air battery according to an embodiment.

FIG. 6 is a schematic view illustrating a structure of a lithium-air battery 500 according to an embodiment. Referring to FIG. 6, the lithium-air battery 500 according to an embodiment may include a cathode 200 adjacent to a first current collector 210, and which uses oxygen as an active material, an anode 300 adjacent to a second current collector 310 and including lithium, and a first electrolyte membrane 400 interposed between the cathode 200 and the anode 300. The first electrolyte membrane 400 may be a separator impregnated with a liquid electrolyte. A second electrolyte membrane 450 may be arranged between the cathode 200 and the first electrolyte membrane 400. The second electrolyte membrane 450 may be a lithium-ion conductive solid electrolyte membrane. The first current collector 210 may be porous and function as a gas diffusion layer which allows diffusion of air. A pressing member 220 for transporting air to the cathode 200 may be disposed on the first current collector 210. A case 320 made of an insulating resin may be disposed between the cathode 200 and the anode 300 to electrically insulate the cathode 200 and the anode 300 from one another. The air may be supplied into the lithium-air battery 500 through an air inlet 230a and may be discharged through an air outlet 230b. The lithium-air battery 500 may be accommodated in a stainless steel container.

As used herein, the term "air" as it relates to a lithium-air battery is not limited to atmospheric air, and for convenience, may refer to a combination of gases including oxygen, or may refer to pure oxygen gas. This broad definition of the term "air" also applies to any other terms used herein, including "air battery" and "air electrode."

An embodiment of the present disclosure will now be described in detail with reference to the following examples. However, these examples are only for illustrative purposes and are not intended to limit the scope of the an embodiment of the present disclosure.

EXAMPLES

Manufacture of Lithium-Air Battery

Example 1: Manufacture of Lithium-Air Battery (Cathode/LATP/PEGDME/Li Anode)

A polymer electrolyte as an anode intermediate layer was arranged on a lithium metal foil used as an anode. The polymer electrolyte was prepared by mixing polyethylene glycol dimethyl ether (PEGDME, Mn=100,000 Daltons, Celgard) and lithium bis(trifluoromethylsulonly)imide (LiTFSI) as a lithium salt, in a molar ratio of PEGDME: LiTFSI of about 20:1.

A lithium aluminum titanium phosphate (LATP) layer having a thickness of 180 μm, (available from Ohara Glass Corp., Japan) as a solid electrolyte layer was disposed on the polymer electrolyte.

A slurry prepared by mixing LATP particles having a diameter of about 10 nm to about 1,000 nm, polyvinyl butyral as a binder and a pore former, and ethyl alcohol as a solvent in a weight ratio of about 1:0.1:1 (10% of the binder based on the LATP particles) was coated on the solid electrolyte layer to a thickness of about 50 μm with a coating area of about 0.5 $cm^2$ to thereby forming a porous mixed conductive layer (loading level: about 0.5 milligrams per square centimeter (mg/$cm^2$)).

Then, gold (Au) metal was coated on the porous mixed conductive layer to a thickness of about 5 nm by sputtering, thereby manufacturing a cathode.

After a gas diffusion layer (GDL, 25BC, available from SGL) was arranged on an upper surface of the cathode and a nickel mesh was arranged on the GDL, a resultant cell structure was pressed and fixed with a pressing member to allow transfer of air to the cathode, thereby manufacturing a lithium-air battery.

Example 2

A lithium-air battery was manufactured in the same manner as in Example 1, except that a slurry prepared by mixing LATP particles having a diameter of about 10 nm to about 1,000 nm, polyvinyl butyral as a binder and pore former, and ethyl alcohol as a solvent in a weight ratio of about 1:0.43:3.85 (30% of the binder based on the LATP particles was coated on the solid electrolyte layer (loading level: about 0.2 mg/$cm^2$).

Example 3

A lithium-air battery was manufactured in the same manner as in Example 1, except that a slurry prepared by mixing LATP particles having a diameter of about 10 nm to about 1,000 nm, polyvinyl butyral as a binder and pore former, and ethyl alcohol as a solvent in a weight ratio of about 1:1:9 (50% of the binder based on the LATP particles) was coated on the solid electrolyte layer (loading level: about 0.07 mg/$cm^2$).

Comparative Example 1

A lithium-air battery was manufactured in the same manner as in Example 1, except that Au metal was directly coated on the solid electrolyte layer without coating a slurry on the solid electrolyte layer.

Evaluation Example 1

Specific surface areas of the porous mixed conductive layer of the lithium-air batteries manufactured according to Examples 1 to 3 were measured by the Brunauer-Emmett-Teller (BET) method. Actual reaction areas ($cm^2$) were calculated in consideration of the weights of the actually loaded porous mixed conductive layers. The results are shown in Table 1.

TABLE 1

| Example | Specific surface area (BET) ($m^2$/g) | Reaction area ($cm^2$) |
|---|---|---|
| Example 1 | 4.69 | 93.8 |
| Example 2 | 5.38 | 139.9 |
| Example 3 | 4.29 | 96.5 |
| Comparative Example 1 | 0.5 | 0.5 |

Referring to Table 1, the lithium-air batteries according to Examples 1 to 3 were found to have markedly increased specific surface areas of the anodes per same cell area, and thus increased electrode reaction areas, as compared with the lithium-air battery of Comparative Example 1.

Evaluation Example 2: Charge-Discharge Test

After discharging the lithium-air batteries manufactured in Example 2 and Comparative Example 1 at a temperature of about 40° C. and at about 100% relative humidity under oxygen atmosphere, the discharge capacity of the lithium-air batteries as measured. The results are shown in FIG. 5.

Figure 5:
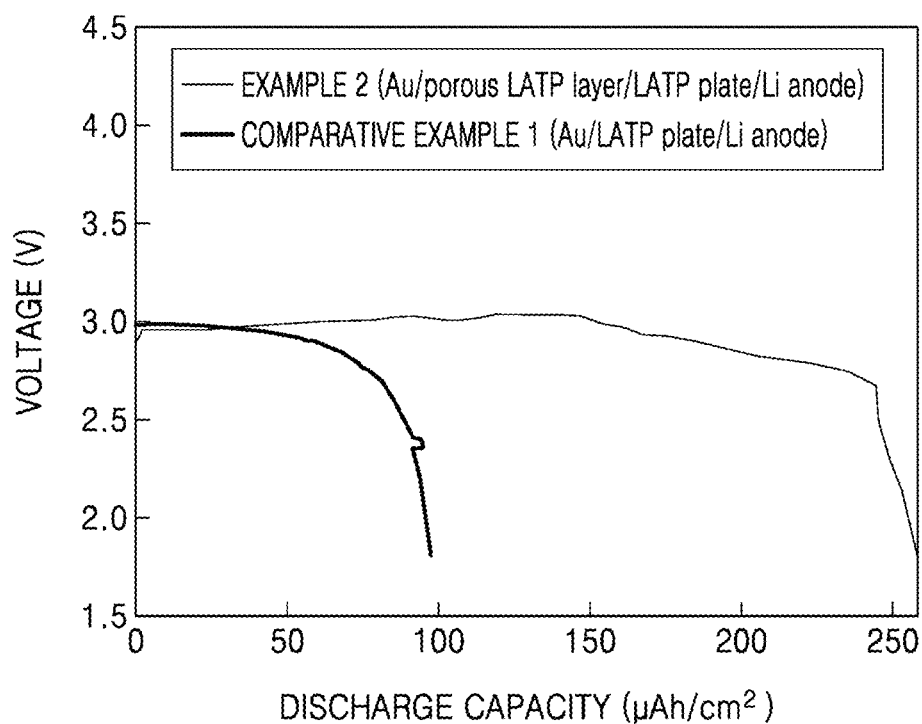
FIG. 5 is a graph of voltage (V) versus discharge capacity (microampere hours per square centimeter, $\mu Ah/cm^2$) illustrating the discharge capacity of lithium-air batteries of Example 2 and Comparative Example 1.

Referring to FIG. 5, as compared with a discharge capacity (98 μAh/$cm^2$) of the lithium-air battery of Comparative Example 1 manufactured without a porous mixed conductive layer, the lithium-air battery of Example 2 was found to have a markedly increased discharge capacity of about 258 μAh/$cm^2$.

As described above, according to the an embodiment, by the inclusion of a cathode with a electrolyte layer including core-shell structured particles, a lithium-air battery may have improved discharge capacity and lifetime characteristics.

It should be understood that embodiments described herein should be considered in a descriptive sense only and not for purposes of limitation. Descriptions of features or aspects within each embodiment should be considered as available for other similar features or aspects in other embodiments.

While an embodiment have been described with reference to the figures, it will be understood by those of ordinary skill in the art that various changes in form and details may be made therein without departing from the spirit and scope as defined by the following claims.

What is claimed is:

1. A lithium-air battery comprising:
an anode comprising lithium metal or a lithium alloy;
a cathode configured to use oxygen as a cathode active material; and an electrolyte layer between the cathode and the anode,
wherein the cathode comprises a mixed conductive layer,
wherein the mixed conductive layer comprises a core-shell structured particle comprising
a core portion comprising a solid electrolyte, and
a shell portion comprising an electronic conductor, and
wherein the mixed conductive layer has a porosity of about 5 percent to about 80 percent, and comprises a gas comprising oxygen contacting and in a pore of the mixed conductive layer, and
wherein the mixed conductive layer has an ionic conductivity of about $1.0 \times 10^{-4}$ Siemens per centimeter or greater.

2. The lithium-air battery of claim 1, wherein the solid electrolyte comprises a lithium-ion-conductive glass, a lithium-ion-conductive crystal, or a combination thereof.

3. The lithium-air battery of claim 2, wherein the solid electrolyte comprises at least one of lithium-aluminum-germanium-phosphate, lithium-aluminum-titanium-phosphate, or lithium-aluminum-titanium-silicon-phosphate.

4. The lithium-air battery of claim 1, wherein the electronic conductor comprises a metal, a metal oxide, or a combination thereof.

5. The lithium-air battery of claim 1, wherein the electronic conductor comprises at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, Pb, or an oxide thereof.

6. The lithium-air battery of claim 1, wherein the shell portion has an average thickness of about 10 nanometers or less.

7. The lithium-air battery of claim 1, wherein the mixed conductive layer has a porosity of about 10 percent to about 75 percent.

8. The lithium-air battery of claim 1, wherein the mixed conductive layer has an electronic conductivity of about $1.0 \times 10^{-4}$ Siemens per centimeter or greater.

9. The lithium-air battery of claim 1, wherein the electrolyte layer is non-porous.

10. The lithium-air battery of claim 1, wherein the electrolyte layer comprises the solid electrolyte.

11. The lithium-air battery of claim 1, wherein the mixed conductive layer is disposed on the electrolyte layer.

12. The lithium-air battery of claim 1, wherein the electrolyte layer comprises:
an organic layer comprising a crosslinked copolymer; and
a plurality of solid electrolyte particles,
wherein the electrolyte layer is a composite layer.

13. The lithium-air battery of claim 12, wherein the organic layer has a water permeability of about 0.001 gram of water per square meter per day to about 1 gram of water per square meter per day and an oxygen permeability of about $1.0 \times 10^{-3}/m^2$ day to about 2,000 $cm^3/m^2$ day.

14. The lithium-air battery of claim 12, wherein the mixed conductive layer is disposed on the plurality of solid electrolyte particles.

15. The lithium-air battery of claim 14, wherein the mixed conductive layer is not disposed on the organic layer.

16. A method of manufacturing a lithium-air battery, the method comprising:
coating a slurry on a solid electrolyte layer to provide a coated solid electrolyte layer, wherein the slurry comprises a plurality of solid electrolyte particles and at least one of a pore former or a binder;
thermally treating the coated solid electrolyte layer; and
depositing an electronic conductor on the coated solid electrolyte layer after the thermal treatment to form an electronic conductor coating layer on each of the plurality of solid electrolyte particles of the coated solid electrolyte layer to form a cathode, and
disposing the cathode on an electrolyte layer and an anode to provide the lithium-air battery of claim 1.

17. The method of claim 16, wherein the plurality of solid electrolyte particles comprise a solid electrolyte which is the same as a solid electrolyte in the solid electrolyte layer.

18. A method of manufacturing a lithium-air battery, the method comprising:
providing a slurry comprising a plurality of coated solid electrolyte particles and at least one of a pore former or a binder;
coating the slurry on a solid electrolyte layer to provide a coated solid electrolyte layer; and
thermally treating the coated solid electrolyte layer to form a cathode; and
disposing the cathode on an electrolyte layer and an anode to provide the lithium-air battery of claim 1.

* * * * *